(12) United States Patent
Marszal et al.

(10) Patent No.: US 6,981,334 B2
(45) Date of Patent: Jan. 3, 2006

(54) DUAL WEDGE FIXTURE LOCATOR

(75) Inventors: Dean N. Marszal, Southington, CT (US); William A. Agli, Meriden, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/449,303

(22) Filed: May 29, 2003

(65) Prior Publication Data

US 2004/0237324 A1 Dec. 2, 2004

(51) Int. Cl.
*G01B 5/25* (2006.01)

(52) U.S. Cl. .......................................... 33/645; 403/315

(58) Field of Classification Search ................. 33/613, 33/645, 520, 533, 549; 403/315, 316, 319, 403/321, 322.1, 324
See application file for complete search history.

(56) References Cited

U.S. PATENT DOCUMENTS

| | | | | |
|---|---|---|---|---|
| 140,715 | A * | 7/1873 | Lahman | 403/324 |
| 1,064,715 | A * | 6/1913 | Dickenson | 33/613 |
| 3,606,406 | A * | 9/1971 | Walters | 403/315 |
| 3,650,053 | A * | 3/1972 | Baer | 403/316 |
| 3,908,477 | A * | 9/1975 | Teske et al. | 403/315 |
| 4,477,202 | A * | 10/1984 | Price | 403/316 |
| 4,545,230 | A | 10/1985 | Jungesjo | |
| 4,929,113 | A * | 5/1990 | Sheu | 403/324 |
| 5,177,867 | A * | 1/1993 | Danielsson | 29/895.2 |
| 5,584,212 | A * | 12/1996 | Wild | 403/319 |
| 5,979,071 | A * | 11/1999 | Kim | 33/549 |
| 6,099,197 | A * | 8/2000 | Gauron | 403/321 |
| 6,254,303 | B1 * | 7/2001 | Falat et al. | 403/321 |
| 6,439,797 | B1 * | 8/2002 | Campbell | 403/321 |
| 6,604,883 | B2 * | 8/2003 | Broberg | 403/319 |
| 6,718,645 | B2 * | 4/2004 | Berger | 33/555 |
| 2004/0011541 | A1 * | 1/2004 | Kuhnle et al. | 173/131 |

FOREIGN PATENT DOCUMENTS

WO  99/06172  2/1999

* cited by examiner

*Primary Examiner*—G. Bradley Bennett
(74) *Attorney, Agent, or Firm*—Bachman & LaPointe, P.C.

(57) ABSTRACT

A fixture locator comprising a fixture base comprising a first receptive chamber extending along a base centerline comprising a first receptive surface; and two base wedge slots extending into the fixture base and intersecting the first receptive surface; a machine tool mount, comprising a first mating member extending along a mount centerline comprising an outer surface adapted to fit within the first receptive chamber such that the mount centerline is congruent with the base centerline, and two mount wedge slots extending into the machine tool mount a dual wedge which comprises a first wedge prong and a second wedge prong each comprising a first and a second end symmetrically disposed about a wedge centerline, a wedge bridge adapted to connect the first ends of the first and second wedge prongs, and a fastening member adapted to removably fasten the second ends of the first and second wedge prongs wherein each of the first and second wedge prongs are adapted to extend in contact with one of the base wedge slots and the mount wedge slots.

26 Claims, 4 Drawing Sheets

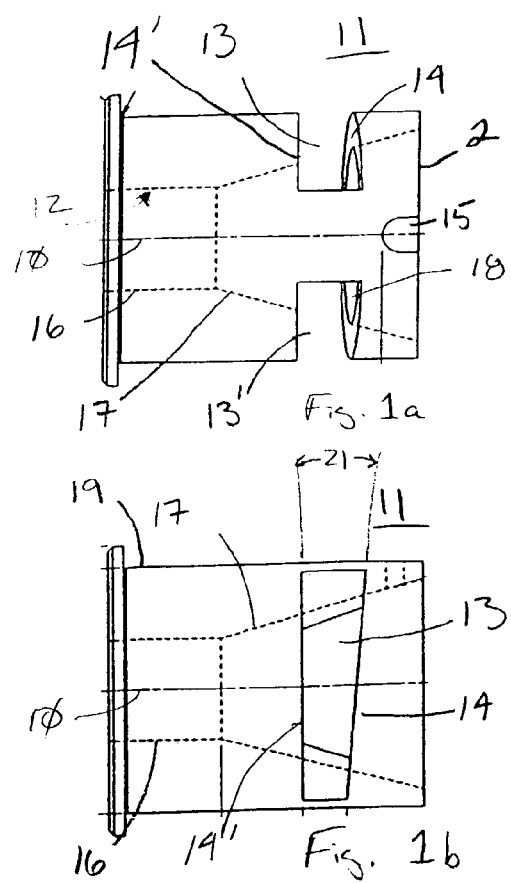
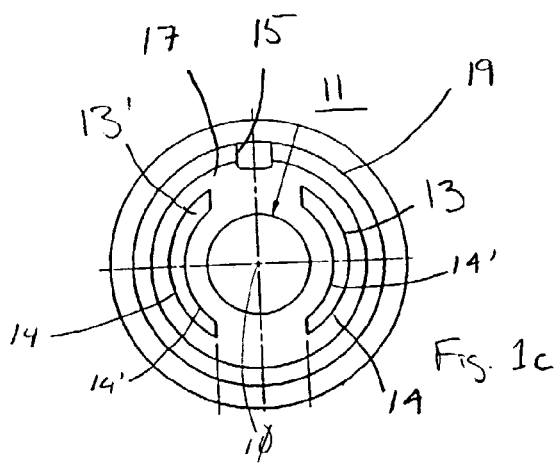

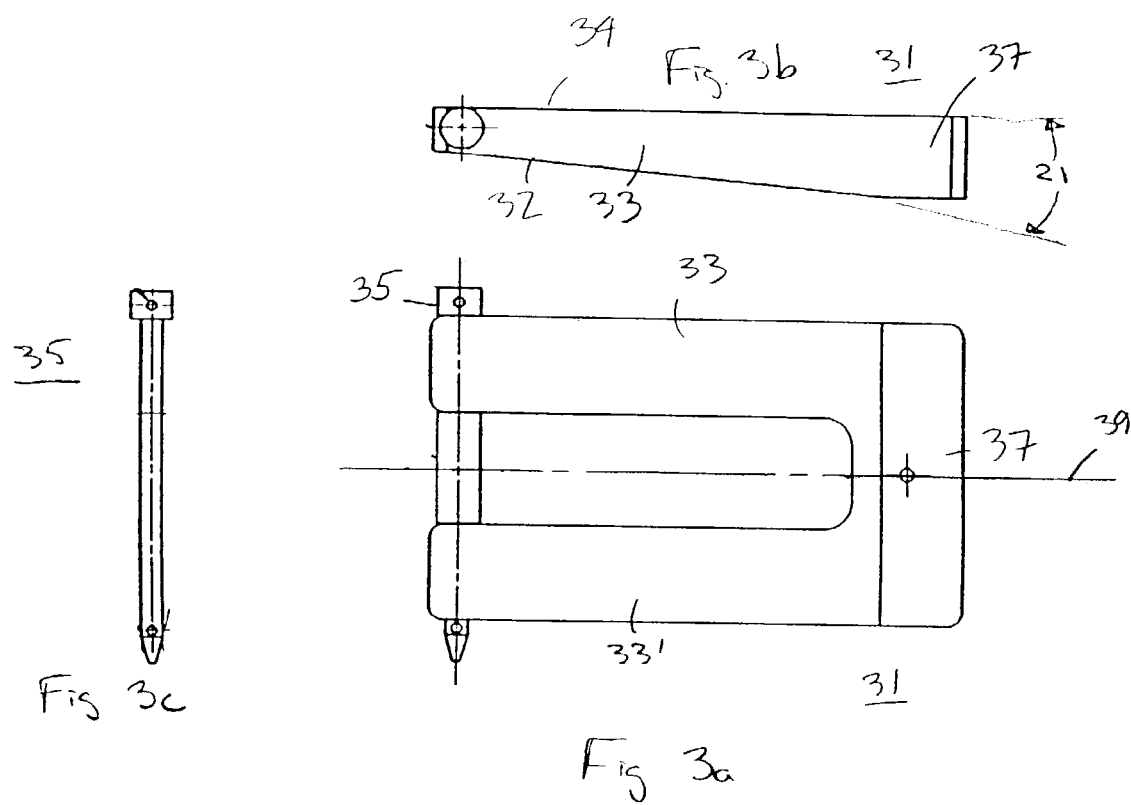

DUAL WEDGE FIXTURE LOCATOR

BACKGROUND OF THE INVENTION (1) Field of the Invention

The present invention relates to an apparatus for securing a fixture base to a fixture mount via a dual wedge.

(2) Description of Related Art

There exists in the field of manufacturing the need to mate a tool mount to a base fixture. In such instances, the tool mount is often times quite heavy and may be extended into and suspended in a caustic environment. One such instance involves electron beam physical vapor deposition (EBPVD). There is therefore required a locator apparatus for securing tool mounts to bases that can be repeatedly used without degradation to the locator requiring substantial retooling.

With specific reference to EBPVD, it is not uncommon for one large wedge to hold an entire fixture in place inside an EBPVD coater. In use, operators have a tendency to drive the wedge in place using a large hammer to secure the heavy coating fixture. This in turn destroys the machined slot by enlarging it beyond the size of the wedge. As a result, the fixture needs to be sent out to have the slot welded back to size. However, it is almost impossible to reproduce the original flat surface of the locator with a weld resulting in a repair with a radial point contact instead of a flat. As a result, the fixture can rotate loose, causing the fixture to jump and bend itself due to the 2000 deg. coating process.

What is therefore needed is an alternative to the single wedge design currently in use.

SUMMARY OF THE INVENTION

Accordingly, it is an object of the present invention to provide an apparatus for securing a fixture base to a fixture mount via a dual wedge.

In further accordance with the present invention, a fixture locator comprises a fixture base comprising a first receptive chamber extending along a base centerline comprising a first receptive surface; and two base wedge slots extending into the fixture base and intersecting the first receptive surface; a machine tool mount, comprising a first mating member extending along a mount centerline comprising an outer surface adapted to fit within the first receptive chamber such that the mount centerline is congruent with the base centerline, and two mount wedge slots extending into the machine tool mount a dual wedge which comprises a first wedge prong and a second wedge prong each comprising a first and a second end symmetrically disposed about a wedge centerline, a wedge bridge adapted to connect the first ends of the first and second wedge prongs, and a fastening member adapted to removably fasten the second ends of the first and second wedge prongs wherein each of the first and second wedge prongs are adapted to extend in contact with one of the base wedge slots and the mount wedge slots.

In further accordance with the present invention, a fixture base for use in a fixture locator comprises a first receptive chamber extending along a base centerline comprises a first receptive surface, and two base wedge slots extending into the fixture base and intersecting the first receptive surface.

In further accordance with the present invention, a machine tool mount for use in a fixture locator comprises a first mating member extending along a mount centerline comprising an outer, and two mount wedge slots extending into the machine tool mount In further accordance with the present invention, a dual wedge for use in a fixture locator comprises a first wedge prong and a second wedge prong each comprising a first and a second end symmetrically disposed about a wedge centerline, a wedge bridge adapted to connect the first ends of the first and second wedge prongs, and a fastening member adapted to removably fasten the second ends of the first and second wedge prongs.

BRIEF DESCRIPTION OF THE DRAWINGS

FIGS. 1a–1c A diagram of the fixture base of the present invention.

FIGS. 3a–3c A diagram of the dual wedge of the present invention.

DETAILED DESCRIPTION OF THE PREFERRED EMBODIMENT(S)

Figure 2A:
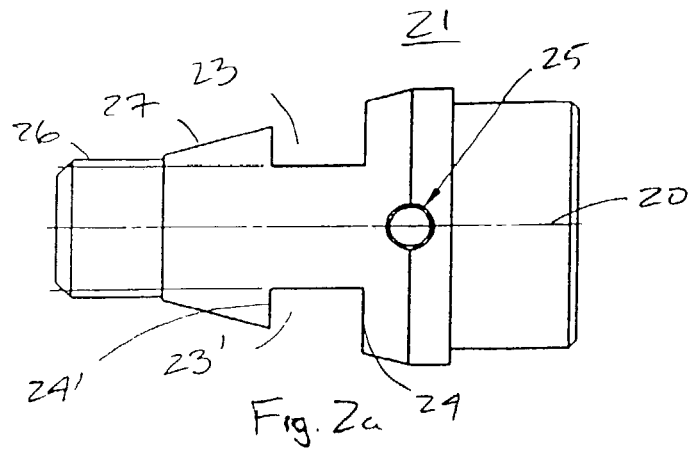
FIGS. 2a–2c A diagram of the fixture mount of the present invention.

It is a central aspect of the present invention to provide a double wedge design for use in fixture locators. The dual wedges of the present invention have two long locating surfaces along the machined detail. Each detail is easily replaceable rather than scrapping out entire fixtures when they get too bent.

With reference to FIGS. 1a–1c, there is illustrated the fixture base 11 of the present invention. Fixture base 11 is symmetrically disposed about a base centerline 10. In a preferred embodiment, fixture base 11 is cylindrical in form. By "cylindrical", it is meant that the outer surface of fixture base 11 is cylindrical in form but for minor deviations from a perfect cylindrical form owing to the fabrication of the base wedge slots 13 and alignment recess 15 as described more fully below. Fixture base 11 contains a first receptive chamber 17 open to one end 2 of fixture base 11 and extending a distance into fixture base 11 along base centerline 10. In a preferred embodiment, first receptive chamber 17 is conical in form and symmetrically disposed about base centerline 10. Most preferred, first receptive chamber 17 forms a frustum. First receptive chamber 17 extends so as to carve out a chamber in fixture base 11, creating a first receptive chamber surface 18. As will be described more fully below, it is this first receptive chamber that accepts, and into which is inserted, first mating member 27. In a preferred embodiment, a second receptive chamber 12 extends along base centerline 10 away from the first receptive chamber 17. In the preferred embodiment, second receptive chamber 12 creates a second receptive chamber surface 12 symmetrically disposed about base centerline 10. In such an embodiment, second receptive chamber 16 accepts, and into which may be inserted, second mating member 26 as discussed more fully below.

Two base wedge slots 13, 13' extend into fixture base 11. The base wedge slots 13, 13' extend primarily perpendicular to base centerline 10 and intersect not only an outer surface of fixture base 11, but also extend through the first receptive chamber surface 18 opposite each other about the centerline 10. By extending in this fashion, each base wedge slot 13 forms a first and second base slot boundary 14, 14'. Both the first and second base slot boundary 14, 14' reside in planar fashion inclined to one another by a wedge angle 21. In a preferred embodiment, this wedge angle is between 40 ai.id 70, most preferably approximately 5°. The exemplary slot boundaries 14 of the base wedge slots 13, 13' are coplanar. The exemplary slot boundaries 14' of the base wedge slots 13, 13' are coplanar.

In a preferred embodiment, fixture base 11 has an alignment recess 15. As will be discussed more fully below, alignment recess 15 is constructed so as to accept alignment member 25 located upon machine mount tool 21. By accepting the alignment member 25 in this fashion, alignment recess 15 assures alignment of the machine tool mount 21 with the fixture base 11 in a desired configuration.

Figure 2B:
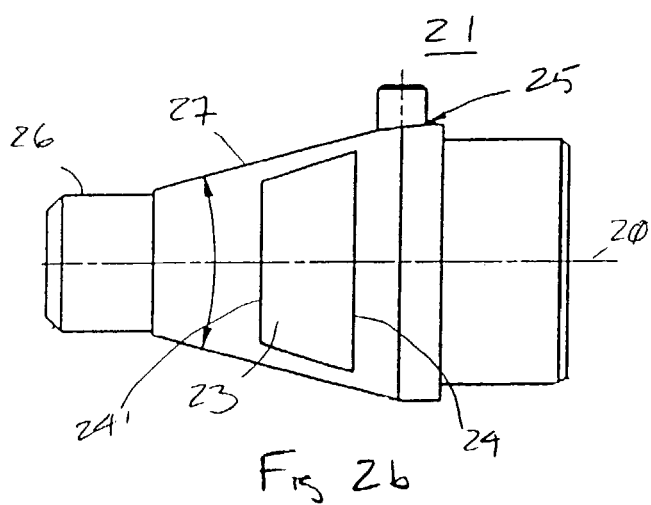
Figure 2C:
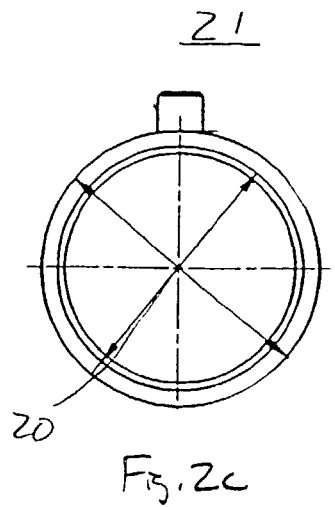

With reference to FIGS. 2A–2C, there is illustrated the machine tool mount 21 of the present invention. Machine tool mount 21 comprises a first mating member 27, which extends along a mount centerline 20. In a preferred embodiment, first mating member 27 is conical in form. Most preferably, first mating member 27 forms a frustum which corresponds in dimensions to that of the first receptive chamber 17. Extending perpendicular to the mount centerline 20, are two mount wedge slots 23, 23' opposite each other about the centerline 20. The exemplary slot boundaries 24 of the mount wedge slots 23, 23' are coplanar. The exemplary slot boundaries 24' of the mount wedge slots 23, 23' are coplanar. When machine tool mount 21 is inserted into fixture base 11, the mount wedge slots 23, 23' are capable of being aligned with the base wedge slots 13, 13' such that the dual wedge 31 of the present invention, described more fully below, may be inserted in contact with the planar surfaces forming the mount wedge slots 23, 23' and the base wedge slots 13, 13'. In a preferred embodiment, machine tool mount 21 further comprises a second mating member 26 extending along mount centerline 20 away from first mating member 27. Second mating member 26 corresponds in dimensions to the recess formed by the second receptive chamber 12 of fixture base 11. As a result, when machine tool mount 21 is extended into fixture base 11, both a first mating member 27 and a second mating member 26 fit in second receptive chamber 16 and first receptive chamber 17, respectively, such that second receptive chamber surface 12 and first receptive chamber surface 18 rest in contact with the outer surfaces of second mating member 26 and first mating member 27.

Alignment member 25 protrudes from first mating member 27. In a preferred embodiment, alignment member 25 is cylindrical in form, and of a dimension to fit tightly within alignment recess 15. In such an embodiment, alignment recess 15 is additionally a semi-circular recess. The exemplary alignment recess 15 extends transverse to the centerline 10 from a lateral exterior surface 19 (FIG. 2) of the base to the first receptive surface 17 and is open to the longitudinal end surface 2 of the base. While illustrated as cylindrical in form and semi-circular in form, alignment member 25 and alignment recess 15 may be of any shape sufficient to allow insertion of alignment member 25 into alignment recess 15 so as to prevent rotation of the machine tool mount 21 about mount centerline 20 when inserted into fixture base 11.

When machine tool mount 21 is inserted into fixture base 11, mount centerline 20 and base centerline 10 are both parallel and congruent. That is to say both centerlines are in close conformity in space with one another. In addition, once alignment member 25 is inserted into alignment recess 15, machine tool mount 21 is prevented from rotating about mount centerline 20.

In order to assure that machine tool mount 21, once inserted into fixture base 11, does not detach from fixture base 11, there is provided the dual wedge 31 of the present invention, as illustrated in FIGS. 3A–3C. Dual wedge 31 consists of first and second wedge prongs 33, 33'. Each of said first and second wedge prongs 33, 33' have a first end connected to a wedge bridge 37 and a second end. Wedge bridge 37 connects the first ends of the wedge prongs forming a U-shaped formation. The two wedge prongs are symmetrically disposed about a wedge centerline 39. In addition, each wedge prong 33 consists of a front surface 34 and a back surface 32. Front surface 34 and back surface 32 are planar in construction and inclined to one another by wedge angle 21. Note that first and second base slot boundaries 14, 14' are inclined to one another by the wedge angle 21, the edges comprising mount wedge slots 23, 23' are inclined at the wedge angle 21, and the front surface 34 and back surface 32 of the dual wedge 31 is inclined at the wedge angle 21. As a result, the first and second wedge prongs of the dual wedge 31 may be inserted into the base wedge slots 13 and the mount wedge slots 23 forming close contact with the first and second base slot boundaries 14, 14' as well as the surfaces comprising mount wedge slot 23 to form a tight seal along the surface areas comprising the aforementioned areas. After extending into the base wedge slots 13, 13' and the mount wedge slots 23, 23', dual wedge 31 is secured to prevent removal from the aforementioned configuration, by fastening member 35. Fastening member 35 may be any form of fastener sufficient to prevent the removal of the dual wedge 31 from contact with the fixture base 11 and the machine tool mount 21 so as to assure their continued tight fit one with the other. In a preferred embodiment, fastening member 35 forms a pin which may be inserted through a second end of both wedge prongs 33, 33'. Once inserted through the ends of wedge prong 33, fastening member 35 may be secured in place to prevent removal through the use of a pin, clamp, or other such article.

Figure 4:
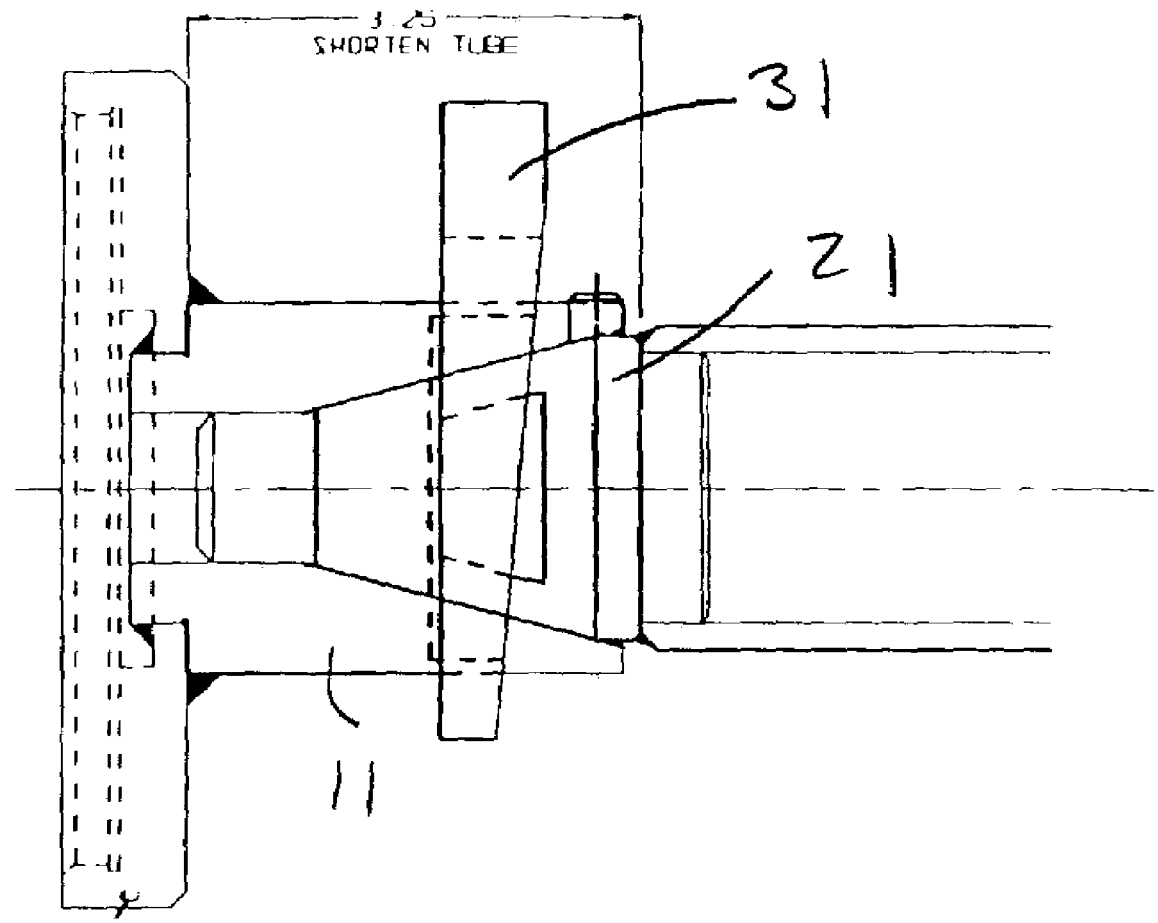
FIG. 4 A diagram illustrating the interaction of the fixture mount, the fixture base, and the dual wedge of the present invention.

With reference to FIG. 4, there is illustrated an assembled fixture located of the present invention.

It is apparent that there has been provided in accordance with the present invention an apparatus for securing a fixture base to a fixture mount via a dual wedge which fully satisfies the objects, means, and advantages set forth previously herein. Specifically, it is contemplated that one could combine any number of techniques disclosed herein to further satisfy the object of the present invention. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A fixture locator, comprising:
   a fixture base, comprising:
      a first receptive chamber extending along a base centerline comprising a first receptive surface; and
      two base wedge slots extending into said fixture base and intersecting said first receptive surface;
   a machine tool mount, comprising:
      a first mating member extending along a mount centerline comprising an outer surface adapted to fit within said first receptive chamber such that said mount centerline is congruent with said base centerline; and
   two mount wedge slots extending into said machine tool mount;
   a dual wedge, comprising:
      a first wedge prong and a second wedge prong each comprising a first and a second end symmetrically disposed about a wedge centerline;
      a wedge bridge adapted to connect said first ends of said first and second wedge prongs; and
      a fastening member adapted to removably fasten said second ends of said first and second wedge prongs wherein each of said first and second wedge prongs are adapted to extend in contact with one of said base wedge slots and said mount wedge slots.

2. The fixture locator of claim 1 wherein said fixture base is cylindrically disposed about said base centerline.

3. The fixture locator of claim 1 wherein said first receptive chamber comprises a frustum.

4. The fixture locator of claim 1 wherein said two base wedge slots each form a first and a second planar base slot boundary angularly inclined to one another by a wedge angle.

5. The fixture locator of claim 4 wherein said mount wedge slots each form a first and a second planar mount slot boundary angularly inclined to one another by said wedge angle.

6. The fixture locator of claim 5 wherein each of said first and second wedge prongs comprises a front surface and a rear surface angularly inclined to one another by said wedge angle.

7. The fixture locator of claim 1 wherein said fixture base additionally comprises a second receptive chamber away from said first receptive chamber along said base centerline comprising a second receptive chamber surface.

8. The fixture location of claim 7 wherein said machine tool mount additional comprises a second mating member extending along said mount centerline away from said first mating member adapted to fit within said first receptive chamber.

9. The fixture locator of claim 1 wherein said fixture base additionally comprises an alignment recess.

10. The fixture locator of claim 9 wherein said alignment recess is semi-circular.

11. The fixture locator of claim 9 wherein said machine tool mount comprises an alignment member adapted to be inserted into said alignment recess.

12. The fixture locator of claim 1 wherein said fastening member comprises a pin.

13. A fixture base for use in a fixture locator comprising:
first and second end surfaces and a lateral exterior surface therebetween;
a first receptive chamber extending along a base centerline from the first end and comprising a first receptive surface; and
two base wedge slots opposite each other about the base centerline extending into said fixture base from said lateral exterior surface in a direction generally perpendicular to said base centerline and intersecting said first receptive surface.

14. The fixture base of claim 13 wherein said fixture base is cylindrically disposed about said base centerline.

15. The fixture base of claim 13 wherein said first receptive chamber comprises a frustum.

16. The fixture base of claim 13 wherein said fixture base additionally comprises a second receptive chamber away from said first receptive chamber along said base centerline comprising a second receptive chamber surface.

17. The fixture base of claim 13 wherein said fixture base additionally comprises an alignment recess.

18. The fixture base of claim 17 wherein said alignment recess is semi-circular.

19. The fixture base of claim 13 wherein said two base wedge slots each form a first and a second planar base slot boundary angularly inclined to one another by a wedge angle.

20. The fixture base of claim 17 wherein said alignment recess extends transverse to the centerline from the lateral exterior surface of the base to the first receptive surface and is open to the first end surface of the base.

21. The fixture base of claim 13 wherein said two base wedge slots each form a first and a second planar base slot boundary angularly inclined to one another by a wedge angle, the first planar base slot boundaries of the two base wedge slots being coplanar and the second planar base slot boundaries of the two base wedge slots being coplanar.

22. A machine tool mount for use in a fixture locator, comprising:
a first mating member extending along a mount axial centerline comprising a lateral outer surface; and
two outwardly opening mount wedge slots extending into said machine tool mount in a direction generally perpendicular to said mount centerline.

23. The machine tool mount claim 22 wherein said mount wedge slots each form a first and a second planar mount slot boundary angularly inclined to one another by a wedge angle.

24. The machine tool mount of claim 22 wherein said machine tool mount additional comprises a second mating member extending along said mount centerline away from said first mating member.

25. The machine tool mount of claim 22 wherein said machine tool mount comprises an alignment member.

26. The machine tool mount of claim 22 wherein said mount wedge slots each form a first and a second planar mount slot boundary angularly inclined to one another by a wedge angle, the first planar mount slot boundaries of the two mount wedge slots being coplanar and the second planar base slot boundaries of the two mount wedge slots being coplanar.

* * * * *

UNITED STATES PATENT AND TRADEMARK OFFICE
CERTIFICATE OF CORRECTION

| | |
|---|---|
| PATENT NO. | : 6,981,334 B2 |
| APPLICATION NO. | : 10/449303 |
| DATED | : January 3, 2006 |
| INVENTOR(S) | : Dean N. Marszal et al. |

It is certified that error appears in the above-identified patent and that said Letters Patent is hereby corrected as shown below:

In column 6, claim 22, line 29, after "extending" --opposite each other about the mount centerline-- should be inserted.

In column 6, claim 22, line 30, after "mount" --from the outer surface-- should be inserted.

Signed and Sealed this

Second Day of January, 2007

JON W. DUDAS
*Director of the United States Patent and Trademark Office*